US005491814A

United States Patent [19]
Yee et al.

[11] Patent Number: 5,491,814
[45] Date of Patent: Feb. 13, 1996

[54] APPARATUS USING A STATE MACHINE FOR GENERATING SELECTABLE CLOCK FREQUENCIES AND A FIXED FREQUENCY FOR OPERATING A COMPUTER BUS

[75] Inventors: Dawson L. Yee, Beaverton; Edward L. Solari, Monmouth, both of Oreg.

[73] Assignee: Intel Corporation, Santa Clara, Calif.

[21] Appl. No.: 13,146

[22] Filed: Feb. 1, 1993

Related U.S. Application Data

[63] Continuation of Ser. No. 649,604, Feb. 1, 1991, abandoned.

[51] Int. Cl.⁶ .................................. G06F 1/06; G06F 1/08
[52] U.S. Cl. .................. 395/550; 395/880; 364/DIG. 1; 364/240.1; 364/240.3; 364/270.1; 364/270.2
[58] Field of Search ..................................... 395/550, 275, 395/325, 500, 800

[56]  References Cited

U.S. PATENT DOCUMENTS

| | | | |
|---|---|---|---|
| 4,095,267 | 6/1978 | Morimoto | 395/550 |
| 4,507,732 | 3/1985 | Catiller et al. | 395/275 |
| 4,523,274 | 6/1985 | Fukunaga et al. | 395/325 |
| 4,631,702 | 12/1986 | Korba | 395/550 |
| 4,719,593 | 1/1988 | Threewitt et al. | 395/550 |
| 4,725,944 | 2/1988 | Koenig | 395/550 |
| 4,740,891 | 4/1988 | Kirkpatrick | 395/550 |
| 4,819,164 | 4/1989 | Branson | 395/550 |
| 4,823,262 | 4/1989 | Calle | 395/550 |
| 4,835,728 | 5/1989 | Si et al. | 395/550 |
| 4,970,418 | 11/1990 | Masterson | 307/480 |
| 5,021,985 | 6/1991 | Hu et al. | 364/748 |
| 5,077,686 | 12/1991 | Rubinstein | 395/550 |
| 5,125,088 | 6/1992 | Culley | 395/500 |
| 5,159,679 | 10/1992 | Culley | 395/425 |
| 5,163,146 | 11/1992 | Antanaitis, Jr. et al. | 395/550 |
| 5,179,667 | 1/1993 | Iyer | 395/275 |
| 5,263,172 | 11/1993 | Olnowich | 395/800 |
| 5,319,771 | 6/1994 | Takeda | 395/550 |

FOREIGN PATENT DOCUMENTS

| | | |
|---|---|---|
| 0453199A2 | 12/1981 | European Pat. Off. . |
| 0359233 | 3/1990 | European Pat. Off. ........ G06F 13/42 |

Primary Examiner—Thomas C. Lee
Assistant Examiner—Lance L. Barry
Attorney, Agent, or Firm—Blakely, Sokoloff, Taylor & Zafman

[57]  ABSTRACT

A computer system has a dynamically adjustable speed bus. The dynamic speed bus system decreases the length of the bus cycle accesses required for fast peripherals; but, maintains normal (longer) length bus cycles for slower peripherals. Circuitry is provided to decrease the bus cycle length by increasing the clock frequency to the bus controller which controls the bus. When accessing peripherals that can support only normal length bus cycles, the circuitry of the present invention drives the bus controller with the normal lower clock frequency. When accessing faster peripherals, a higher clock frequency is generated such that the waveform transitions smoothly between the low and high bus frequencies. The dynamic speed bus circuitry of the present invention is divided into two logic sections: 1) a decode section and 2) a clock generation section. The decode section identifies faster peripherals that are compatible with shorter bus cycles.

3 Claims, 8 Drawing Sheets

APPARATUS USING A STATE MACHINE FOR GENERATING SELECTABLE CLOCK FREQUENCIES AND A FIXED FREQUENCY FOR OPERATING A COMPUTER BUS

This is a continuation of application Ser. No. 07/649,604, filed Feb. 1, 1991, now abandoned.

FIELD OF THE INVENTION

The present invention pertains to the field of computer systems. Specifically, the present invention pertains to the timing of information transfer in computer systems with a bus architecture.

BACKGROUND OF THE INVENTION

Computers and their associated bus architecture and protocol establish a framework upon which other items like integrated circuits and add-on cards (collectively called peripherals) are based. The bus and a bus controller provide a means for the computer to communicate with peripherals coupled to the bus. The functional operation and the bus cycle length used (herein called cycle length) when the computer accesses these peripherals is limited by parameters established by the particular bus and used by the bus controller. Some of the peripherals coupled to the bus are able to operate using shorter bus cycle lengths. Other peripherals require a longer cycle length. One such computer is the IBM/AT personal computer sold by IBM Corp. The bus architecture used by the IBM/AT computer is called the ISA bus.

One way for these computer systems to improve performance is to shorten all the bus cycles on the bus to take advantage of the greater bus bandwidth. However, peripherals that do not support the shorter bus cycles would be incompatible and therefore inoperable with the computer system. One way to avoid this incompatibility is to support two separate buses, one bus that executes shorter bus cycles, another that executes longer bus cycles. This solution, however, requires additional and redundant hardware, thereby increasing the overall cost of the system.

A single bus controller is needed which supports different bus cycle lengths, yet maintains compatibility with all peripherals without the need for additional and redundant hardware.

SUMMARY OF THE INVENTION

The present invention provides a means and method for dynamically adjusting the speed of the bus for a computer system. The dynamic speed bus system decreases the length of the bus cycle accesses required for fast peripherals; but, maintains normal (longer) length bus cycles for slower peripherals. By providing a dynamic speed bus capability, bus compatibility and low cost are preserved; yet, the performance of the computer system is significantly increased.

The dynamic speed bus concept of the present invention is used to decrease the bus cycle length upon demand when required by faster devices. Circuitry is provided to decrease the bus cycle length by increasing the clock frequency to the bus controller which controls the bus. When accessing peripherals that can support only normal length bus cycles, the circuitry of the present invention drives the bus controller with the normal lower clock frequency. When accessing faster peripherals, a higher clock frequency is generated such that the clock waveform to the bus controller transitions smoothly between the low and high bus frequencies. This transition is free of glitches or other erroneous pulses. Any devices on the bus which reference a bus clock will operate correctly as the reference clocks out of the bus are always maintained at the standard fixed frequency.

The dynamic speed bus circuitry of the present invention is divided into two logic sections: 1) a decode section and 2) a clock generation section. The decode section identifies (by decoding the address, or command, etc. during the access) those faster peripherals that are compatible with shorter bus cycles. The decode section signals the clock generation section to supply a higher clock frequency. The higher clock frequency is supplied only for the duration of the cycle in which the faster peripheral is selected.

The clock generation section switches the operating frequency of the bus controller higher when the decode section selects it. When not selected, the clock generation section will supply the bus controller with a normal (low) operating frequency. Any timing reference present on the external bus will be generated by the clock generator and be maintained at the bus default regardless of the decode selection.

If required, any signals to the bus which violate bus specifications when operating in a higher bus speed can be gated, disabled, or screened for the duration that the higher operating speed is selected.

The techniques of the present invention can be applied to both synchronous and asynchronous buses. There is no limit to the number of higher bus frequencies which can be applied to the bus controller in any given system.

DETAILED DESCRIPTION OF THE PREFERRED EMBODIMENT

The present invention provides a means and method for dynamically adjusting the speed of the bus for a computer system. In the following description, numerous specific details are set forth in order to provide a thorough understanding of the invention. However, it will be apparent to one with ordinary skill in the art that these specific details need not be used to practice the present invention. In other instances, well-known structures, circuits, and bus protocols have not been shown in detail in order not to unnecessarily obscure the present invention.

Figure 1:
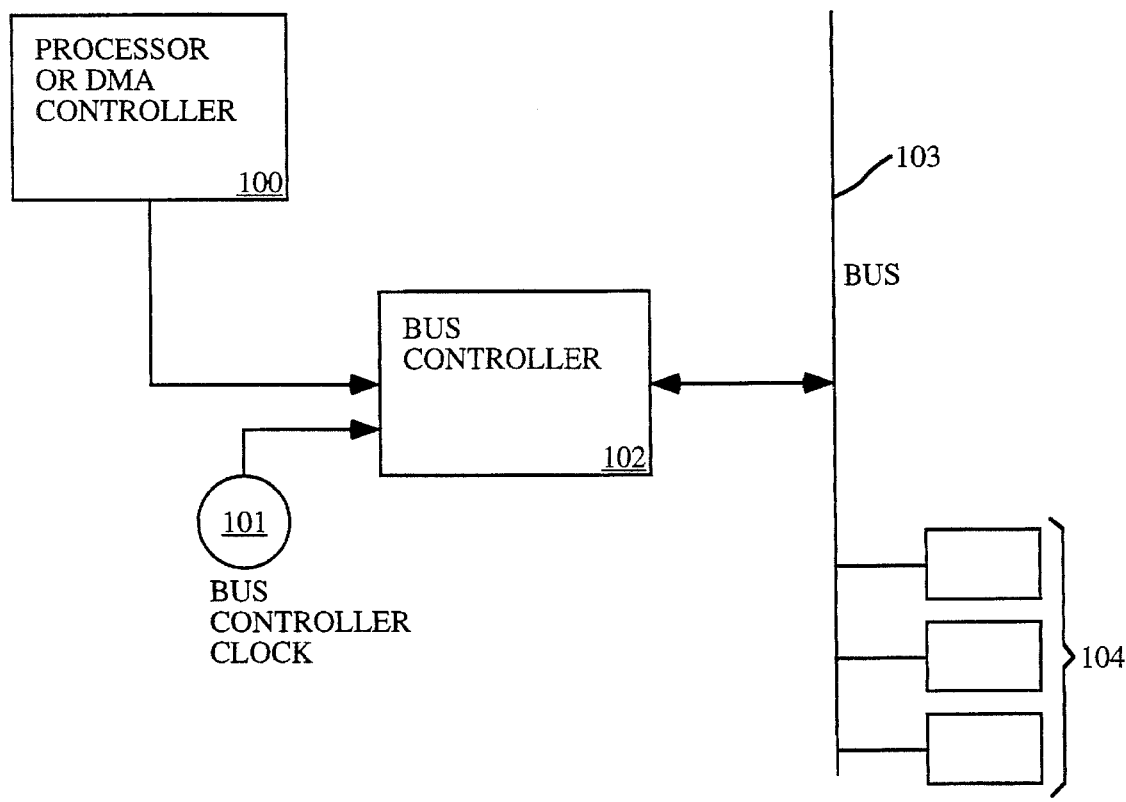
FIG. 1 is an illustration of the typical prior art computer system bus architecture.

Referring to FIG. 1, a typical prior art implementation of a computer system is shown. A system bus 103 is provided for communicating information. Peripheral devices 104 are coupled to the bus 103. Peripheral devices 104 may include integrated circuits, add-on circuit cards, display device drivers, printer drivers, storage media, graphics drivers, or any of a wide range of input/output or control devices. The typical prior art computer system also provides a bus controller 102 for managing communication between devices on the bus 103. A processor (for example, a central processing unit, CPU) 100 is coupled to the bus controller 102. Processor 100 controls the operation of the computer system and the sequence of access requests being made of bus controller 102 for access to peripheral devices 104. Processor 100 can also be a DMA (Direct Memory Access controller) or any other device or circuit that drives bus cycles. Use of the word processor herein is intended to cover these other devices and circuits. Bus controller clock 101 is provided to synchronize the operation of bus controller 102.

In the computer system of FIG. 1, only one bus controller clock 101 is typically provided. Peripheral devices 104 and processor 100 can communicate no faster than the frequency of bus controller clock 101 even though a particular device may be capable of operating at a faster rate. Further, bus controller clock 101 must be set to a frequency no higher than the slowest peripheral device used with the computer system. Thus, the computer system of FIG. 1 must sacrifice the speed of faster peripheral devices in order to maintain compatibility with slower devices.

Figure 2:
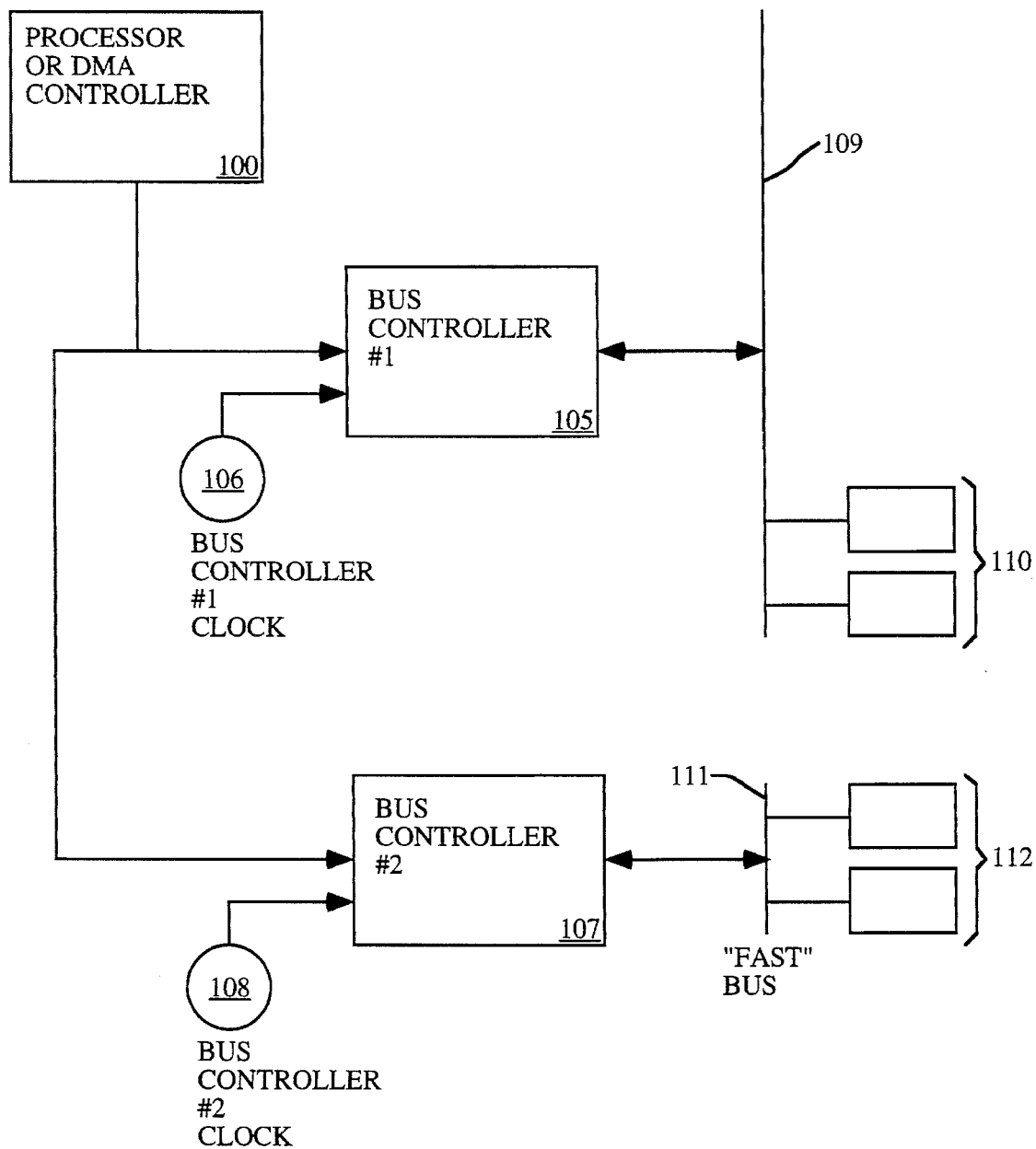
FIG. 2 is an illustration of a prior art bus architecture using two separate busses for different speed peripheral devices.

A prior art improvement to the computer system of FIG. 1 is illustrated in FIG. 2. Referring to FIG. 2, a computer system having two separate busses 109 and 111 is shown. Each bus has a corresponding bus controller 105 and 107. Each bus controller 105 and 107 has a corresponding bus controller clock 106 and 108, respectively. Fast peripheral devices 112 (i.e. those capable of operating at higher bus clock frequencies) are coupled to bus 111, while slow peripheral devices 110 (i.e. those operating only at lower bus clock frequencies) are coupled to bus 109. In the computer system of FIG. 2, greater efficiency and performance is achieved by exploiting the speed of faster peripheral devices; however, the redundant hardware required to implement the computer system of FIG. 2 substantially increases the cost and physical size of the overall system.

Figure 3:
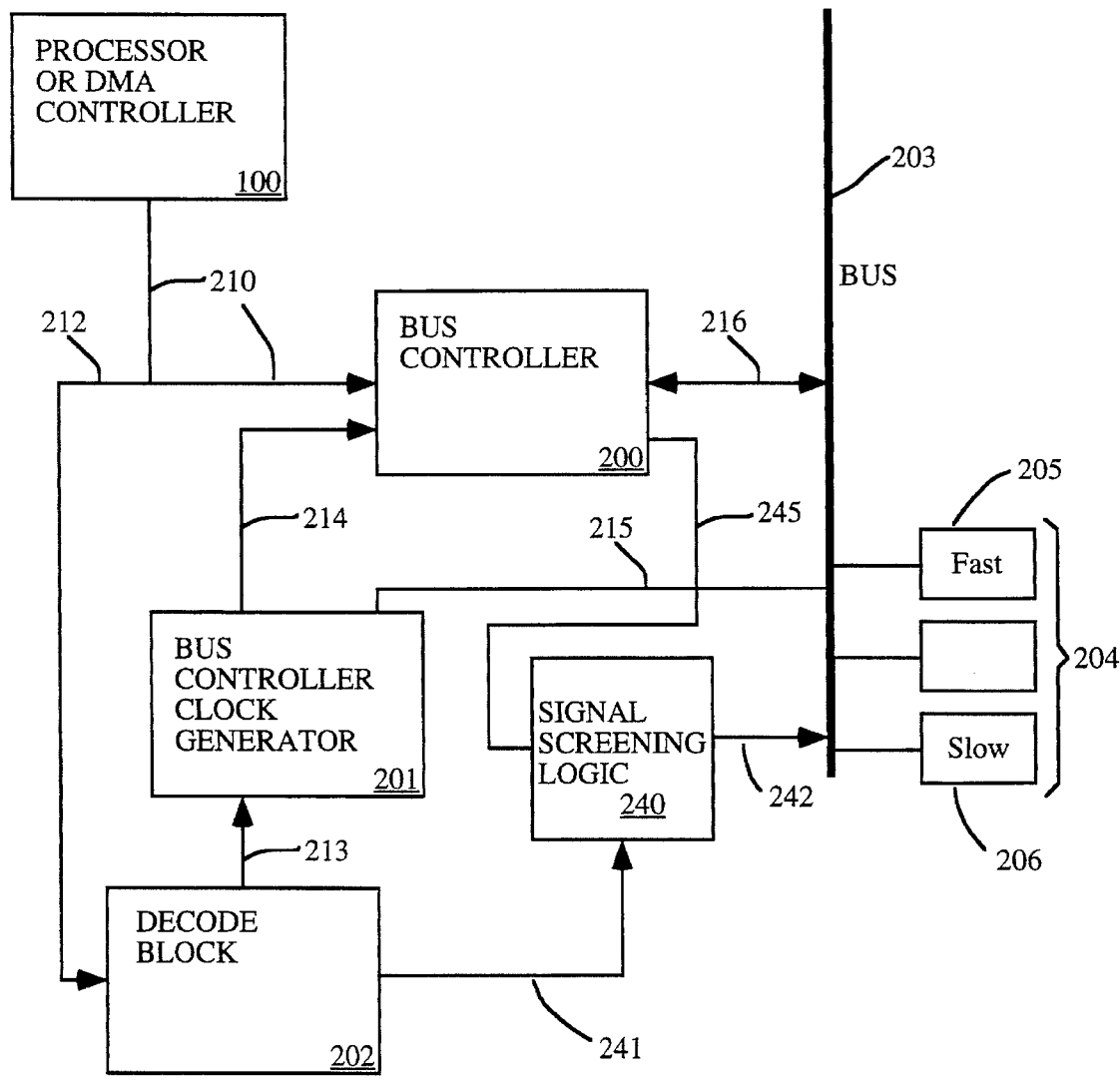
FIG. 3 is an illustration of the dynamic speed bus architecture of the present invention.

Referring now to FIG. 3, a preferred embodiment of the dynamic speed bus architecture of the present invention is illustrated. As shown, a single bus 203 is provided for communicating information between system components. Peripheral devices 204 are coupled to the bus 203. Peripheral devices 204 include both fast and slow peripheral devices. A bus controller 200 is included for managing communication between devices on the bus 203. Processor 100 is coupled to the bus controller 200 via communication line 210.

As shown in FIG. 3, a bus controller clock generator 201 is coupled to bus controller 200 via line 214. The bus controller clock generator 201 includes means for generating clock signals of at least two different clock frequencies. A first clock signal generated by bus controller clock generator 201 is used by a slow peripheral device coupled to bus 203. A second clock signal generated by bus controller clock generator 201 is used by a fast peripheral device coupled to bus 203. The internal architecture of bus controller clock generator 201 is described below and illustrated in FIG. 5.

Referring again to FIG. 3, a preferred embodiment of the present invention includes a bus request decode component (decode block) 202. Decode block 202 is coupled to bus controller clock generator 201 via line 213. Decode block 202 is also coupled to processor 100 via line 212. Line 212 is split from line 210 leading to bus controller 200. The same signals supplied to bus controller 200 by processor 100 are supplied to decode block 200. These signals will be described in more detail below.

Decode block 202 receives bus access requests from processor 100 on line 212. Decode block 202 is responsible for determining the bus clock frequency corresponding to a particular access request made by processor 100. Once the appropriate bus clock frequency is selected, decode block 202 notifies bus controller clock generator 201 of the selected frequency, thereby causing bus 203 to operate at a new clock frequency. Decode block 202 also enables or disables bus signal screening. The operation of decode block 202 is described below and illustrated in FIG. 4.

Figure 4:
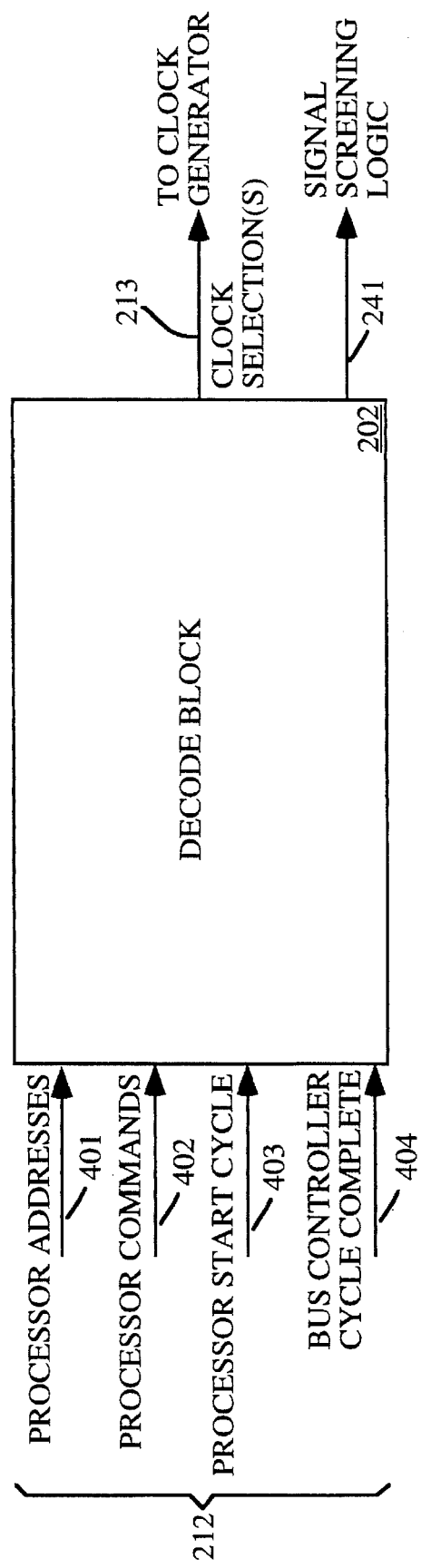
FIG. 4 is an illustration of the decode component of the present invention.

Referring now to FIG. 4, several signals are provided as input to decode block 202 via line 212 from processor 100. These same signals are provided to bus controller 200. Address line 401 is an input to decode block 202. Address line 401 is used by processor 100 to identify the peripheral device with which the processor 100 desires to establish communication. In the preferred embodiment of the present invention, pre-determined ranges of addresses are associated with particular peripheral devices. For example, address range A0000-BFFFF (in hexidecimal) corresponds to video memory. If the processor 100 accesses a memory location in the range A0000-BFFFF, circuitry in the video peripheral device responds when the address is presented on the bus 203. Methods for mapping processor addresses to particular peripheral devices are well known in the art. In the present invention, decode block 202 uses address line 401 to determine which peripheral device is being accessed by processor 100. In this way, a bus clock frequency can be associated with each peripheral device. The decode block 202 selects the correct bus clock frequency based on the address presented on address line 401 by processor 100. In addition, a bus clock frequency may be based on a combination of the address on address lines 401 and command signals on lines 402. These command signals are described next.

Another signal provided on line 212 is a processor command signal 402. Processor command signal 402 identifies the type of access being made to the peripheral device identified by the address line 401. Types of access identified on command line 402 include memory read, memory write, input/output device read, and input/output device write, data access, and command access. The use of these command signals by bus controller 200 is a technique well known in the art. Decode block 202 uses processor command line 402 to determine the type of access being made to a particular peripheral device. By knowing the access command, a bus clock frequency can be associated with each type of access made to a peripheral device. Some types of access may require less time to complete than other accesses. This is true even for the same peripheral device. Access to a peripheral device can be optimized by assigning a bus clock frequency to each type of access. The decode block 202 selects the correct bus clock frequency based on the command presented on command line 402 by processor 100. For example, an address may be presented on address line 401 identifying a video peripheral device as described above. Such a video device is capable of operating in a fast mode (i.e. using a higher bus clock frequency) for some types of access. These fast mode access types can occur during memory read or memory write cycles in combination with a data (i.e. not a control) access. The access type is specified by the command on command line 402. Thus, for this example, decode block 202 enables a fast bus cycle via line 213 if the following three conditions are true: 1) a fast peripheral device is addressed, 2) memory access cycle is specified, and 3) a data cycle is specified. It will be apparent to those skilled in the art that other combinations of address and command signals may be used to trigger a particular clock frequency.

Figure 7:
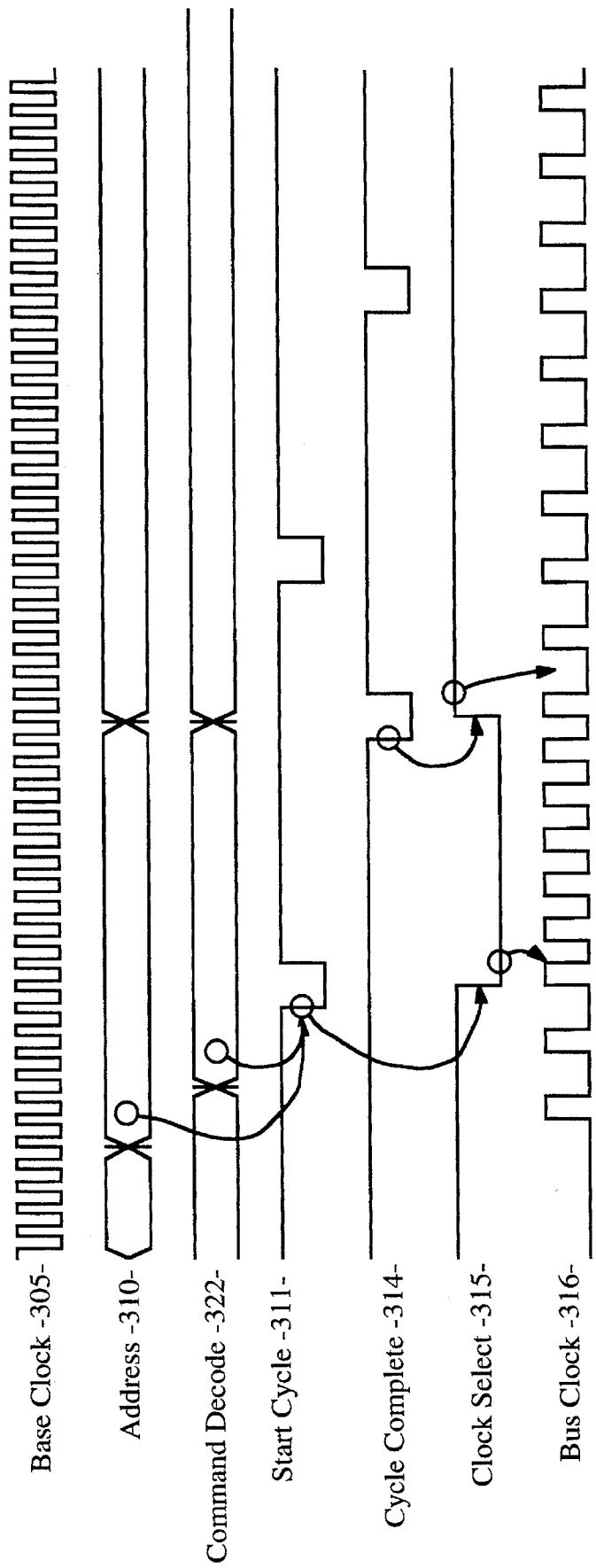
FIG. 7 illustrates a timing diagram of the decode block of the present invention.

Two other signals are provided as input to decode block 202. A processor start cycle signal 403 is used to indicate when a bus cycle has been initiated by the processor 100. When the start cycle signal 403 is asserted, valid information can be latched on address line 401 and command line 402. The proper bus cycle frequency is output to bus controller clock generator 201 via line 213 shortly after receiving the asserted start cycle signal 403. The bus controller cycle complete signal 404 is asserted by bus controller 200 when an access to a peripheral device has been completed. This signal is used by decode block 202 to switch the bus cycle frequency back to a normal (i.e. slower) clock after a faster cycle has been completed. A timing diagram of the sequencing of these signals is illustrated in FIG. 7.

Figure 5:
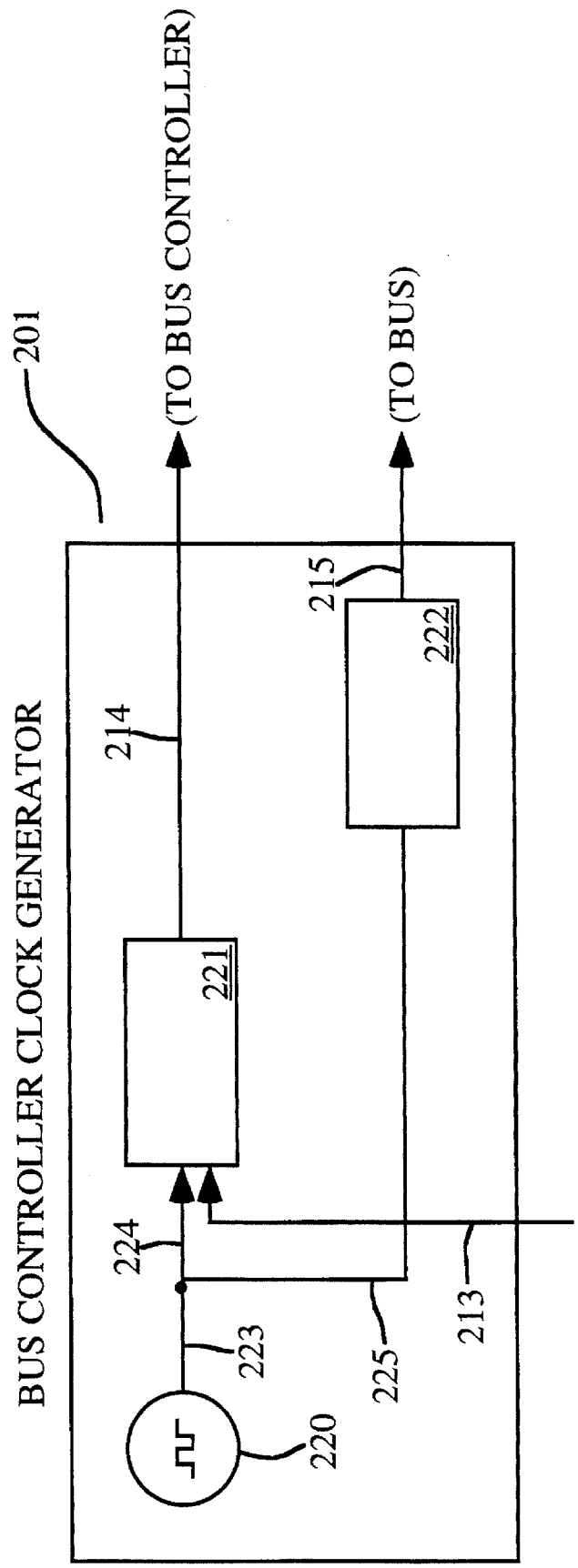
FIG. 5 is an illustration of the clock generator of the present invention.

Referring now to FIG. 5, the internal architecture of bus controller clock generator 201 is illustrated. Clock generator 201 includes a base clock generator 220. Base clock generator 220 can be implemented as a simple oscillator operating at a frequency typically twice as fast as the fastest bus cycle in a particular system. In the preferred embodiment, base clock generator 220 provides a constant 48 Mhz. clock signal. The base clock generator signal 501 is illustrated in FIG. 6b.

Referring again to FIG. 5, a dynamic speed clock generator 221 is illustrated. The dynamic speed clock generator 221 receives the constant base clock signal on line 224 and the clock frequency selection signal on line 213 from decode block 202. Using circuitry within dynamic speed clock generator 221, the base clock frequency is reduced by a value corresponding to the frequency selection specified by clock frequency selection signal on line 213. The reduced base clock frequency is output to bus controller 200 on line 214. As various frequencies are selected with the decode block 202 selection signal, the clock signal output to bus controller 200 changes frequency in response to the selection made by decode block 202; thus, clock generator 221 is a dynamic clock frequency generation device. In an alternative embodiment, various clock frequencies may be generated using a phase lock loop of one clock frequency based on another.

The transition from one clock frequency to another must be glitch-free. A glitch is defined herein as an active clock state of shorter duration than the shortest valid active clock state for a given system. In order to provide a glitch-free transition, the present invention uses a state machine as illustrated in FIG. 6.

Figure 6A:
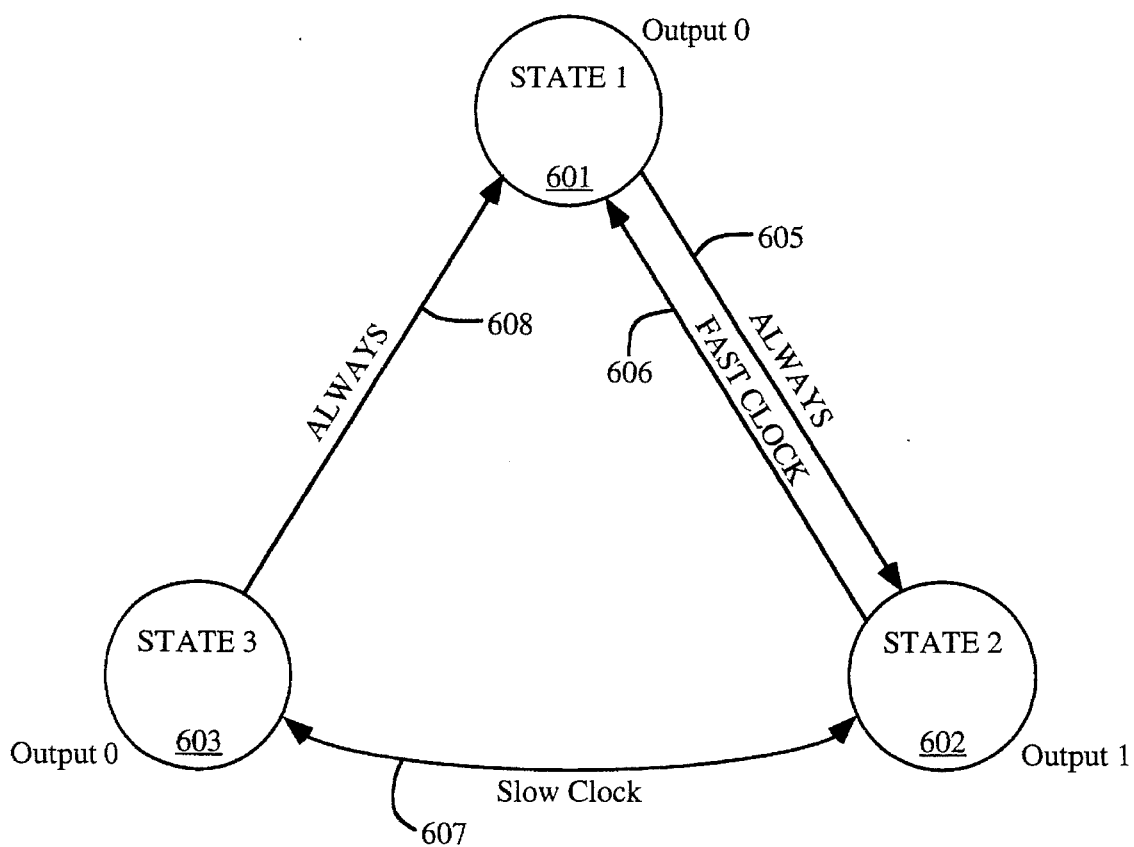
FIG. 6a illustrates a state diagram of the operation clock generator of the present invention.
Figure 6B:
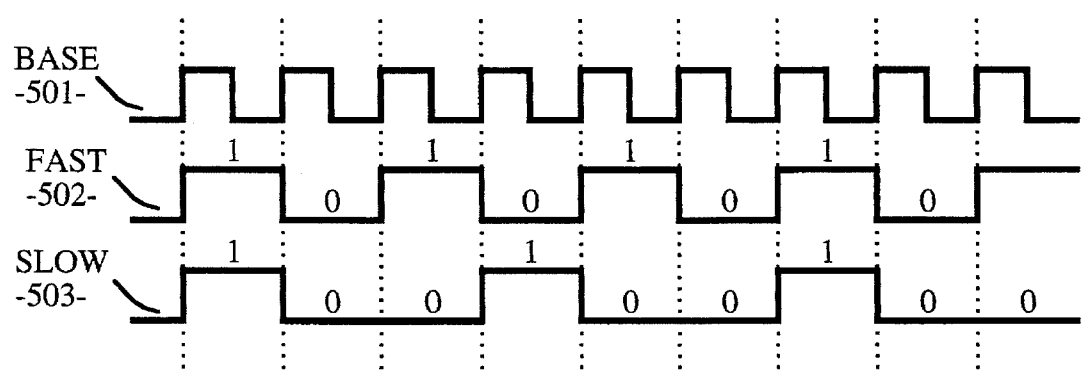
FIG. 6b illustrates a state machine timing diagram of the clock generator, of the present invention.

Referring to FIG. 6a, a state diagram of the circuitry within dynamic speed clock generator 221 is illustrated. In the preferred embodiment of the present invention, three states are provided to generate two different clock frequencies: 1) a slow clock and 2) a fast clock. These states are implemented using a programmable logic device (PLD). Such devices are well known to those of ordinary skill in the art.

At state 1 (601), a value of 1 is output to bus controller 200 on line 214. State 1 continues for one complete base clock cycle (i.e. the time duration from one rising edge of the base clock signal to the next rising edge). At the completion of State 1, the state machine of FIG. 6a transitions to State 2 (602). At State 2, the state machine outputs a value of 0 to bus controller 200 on line 214. State 2 also continues for one complete base clock cycle. At the completion of State 2, the frequency selection signal on line 213 is tested. If the decode block 202 is requesting a fast clock signal, path 606 of the state machine in FIG. 6a is taken back to State 1 where a value of 0 is again output to bus controller 200 on line 214. The effect of these state transitions while a fast clock signal is selected produces the signal 502 illustrated in FIG. 6b. Using the state machine of the preferred embodiment, signal 502 achieves a frequency one half (½) that of the base clock signal frequency 501. In the preferred embodiment, the frequency of signal 502 is 24 Mhz.

Referring again to FIG. 6a, path 607 is taken from State 2 when the decode block 202 has not requested a fast clock signal (or when a normal or slow clock has been requested). In this case, the state machine of FIG. 6a transitions to State 3 (603). At State 3, a value of 0 is output to bus controller 200 on line 214 for one complete base clock cycle. At the completion of this cycle, path 608 is taken unconditionally back to state 1 where a value of 0 is again output to bus controller 200 on line 214 for another complete base clock cycle. The effect of these state transitions while a slow (or not fast) clock signal is selected produces the signal 503 illustrated in FIG. 6b. As shown in FIG. 6b, signal 503 is asserted for one base clock cycle and non-asserted for two base clock cycles. A rising edge of signal 503 occurs every third rising edge of base clock signal 501. Thus, the fast clock signal 502 produced by dynamic speed clock generator 221 is a signal with a frequency one half (½) that of the base clock signal 501. Similarly, the slow (or not fast) clock signal 503 produced by dynamic speed clock generator 221 is a signal with a frequency one third (⅓) that of the base clock signal 501. Using the state machine of the preferred embodiment, these dynamic clock frequency transitions occur without a glitch or other spurious transient signal. It will be apparent to those skilled in the art that additional states may be added to the state machine illustrated in FIG. 6a in order to provide additional clock frequencies other than the divide-by-two (503) or divide-by-three (503) signals illustrated in FIG. 6b. Thus, the dynamic speed clock generator 221 produces a dynamic speed clock signal in response to the frequency selection made by the decode block 202.

The clock signal with the selected frequency is supplied to bus controller 200 via line 214. Bus controller 200 then initiates the access to the appropriate peripheral device using the clock signal supplied to bus controller 200 via line 214. For an access to a fast peripheral device, the access can be completed in a shorter amount of time than possible if a normal (i.e. slow) clock cycle was used. Once the access to a peripheral device is completed, bus controller 200 asserts the bus controller cycle complete signal 404. This signal is received by decode block 202. Once decode block 202 receives the bus controller cycle complete signal 404, decode block 202 de-selects a fast clock cycle via line 213. Slow clock signal 503 is then provided to bus controller 200, until another fast clock access is signalled by decode block 202.

Particular peripheral devices in some computer systems require the presence of a constant clock signal on bus 203. These systems may not operate properly if the dynamic speed clock generator of the present invention modifies the frequency of the clock supplied to bus controller 200. In order to accommodate these peripheral devices, a constant frequency reference clock is also provided by bus controller clock generator 201. The reference clock is generated by circuitry within component 222 which uses the clock signal of the base clock generator 220 as a clock source. Component 222 is therefore coupled to base clock generator 220 via line 225. Methods for generating a constant frequency clock in this manner are well known in the art. The clock output of component 222 is coupled directly to bus 203 via line 215.

In some computer systems, signals present on the bus may violate pre-established bus specifications for the computer system if the signals are present on the bus while the bus is operating at a higher clock speed. In order to prevent the bus specifications from being violated, the offending signals must be disabled while high speed bus operation is in progress. The present invention provides circuitry for screening or disabling bus signals incompatible with high speed operation of the bus. This circuitry is depicted in FIG. 3 as signal screening logic 240. The signal screening logic 240 is coupled to decode block 202 and directly to bus 203 via line 242.

For a particular bus system, signals that would violate bus specifications in high speed bus operation are identified. Circuitry for disabling these signals is included in screening logic 240. During operation of the computer system, decode block 202 determines whether high speed or low speed bus operation is required as described above. If high speed bus operation is required, decode block 202 enables screening logic 240 by a signal on line 241. In response to the enable signal, screening logic 240 disables the previously determined bus signals via line 242. Signals are screened by holding a particular signal in a high state, low state, or tri-state depending upon the logic of the particular signal. The state in which signals are held is assured to be a valid state for the signal while the bus operates using a higher speed clock. During normal or lower speed bus operations, decode block 202 disables screening logic 240 by a signal on line 241. When disabled, screening logic 240 does not affect any signals appearing on bus 203. In this manner, bus specifications are met during all phases of dynamic speed bus operation.

Thus, a dynamic speed bus control means and method useful for dynamically adjusting the speed of a computer system bus is disclosed.

Although this invention has been shown in relation to a particular embodiment, it should not be considered so limited. Rather, it is limited only by the appended claims.

What is claimed is:

1. In a computer system having a bus, peripheral devices coupled to said bus, and a processor coupled to said bus for accessing said peripheral devices, said peripheral devices including at least one slow peripheral device and at least one fast peripheral device, an apparatus for operating said bus using selectable clock frequencies, said apparatus comprising:

a bus controller coupled to said bus, said bus controller including control logic for decoding and executing bus access requests made by said processor for access to said peripheral devices, said bus controller also coupled to said processor;

a clock generator for generating clock signals of at least two different frequencies, a first clock signal for timing accesses to said slow peripheral device, a second clock signal for timing accesses to said fast peripheral device, said clock generator including a state machine for switching between said first clock signal and said second clock signal without producing glitches, said state machine receiving a frequency selection signal, said state machine generating said first clock signal by transitioning through three states if said frequency selection signal indicates a request for a slow clock, said state machine generating said second clock signal by transitioning through two states if said frequency selection signal indicates a request for a fast clock, said clock generator coupled to said bus controller, said clock generator further includes means for generating a reference clock signal on said bus concurrently with said first and said second clock signals, said means for generating a reference clock signal coupled to said bus;

decode logic for selecting one of said clock signals, said decode logic receiving a bus access request from said processor, said decode logic generating said frequency selection signal corresponding to said bus access request, said decode logic coupled to said processor and said clock generator.

2. The apparatus as claimed in claim 1 wherein said decode logic selects one of said clock signals based on an address provided by said processor.

3. The apparatus as claimed in claim 1 including means for disabling a portion of signals on said bus while said bus is operating with said second clock signal.

* * * * *